United States Patent [19]

Barrett

[11] 3,802,066
[45] Apr. 9, 1974

[54] ASSEMBLY METHOD FOR STATOR OR DYNAMO-ELECTRIC MACHINE

[75] Inventor: Edward L. Barrett, La Grange Park, Ill.

[73] Assignee: Walter J. Zenner, Mukwonago, Wis.; a part interest

[22] Filed: Apr. 6, 1972

[21] Appl. No.: 241,768

[52] U.S. Cl. .................. 29/596, 29/606, 310/42, 310/216, 310/254, 310/259
[51] Int. Cl. .............................................. H02k 15/00
[58] Field of Search ........ 29/596, 598, 606; 310/42, 310/216, 218, 254, 258, 259

[56] References Cited
UNITED STATES PATENTS

| 2,501,222 | 3/1950 | Hybler | 310/42 X |
|---|---|---|---|
| 3,440,460 | 4/1969 | Postema | 310/42 |
| 2,145,791 | 1/1939 | Gille | 310/218 X |
| 1,314,128 | 8/1919 | Croll | 310/259 |
| 3,483,613 | 12/1969 | Malcolm et al. | 29/596 X |
| 2,612,681 | 10/1952 | Camras | 29/606 |

FOREIGN PATENTS OR APPLICATIONS

| 232,474 | 4/1959 | Australia | 29/596 |
|---|---|---|---|
| 949,416 | 9/1956 | Germany | 29/606 |
| 67,953 | 9/1940 | Czechoslovakia | 29/596 |

Primary Examiner—Charles W. Lanham
Assistant Examiner—Carl E. Hall
Attorney, Agent, or Firm—Thomas E. Dorn; James B. Kinzer

[57] ABSTRACT

A method of assembling the stator of a dynamo-electric machine, either a motor or an alternator, and the stator produced by that method; the stator core is fabricated as a plurality of core segments, preferably L-shaped in configuration, each segment including a tangent rim element and a radial leg element. The stator core segments are loosely assembled in a cylindrical core and the electrical windings, preferably skein wound, are mounted on the core by insertion from the outside of the assembly through temporary gaps between the rim elements of adjacent core segments formed by spreading the segments, each winding encompassing the leg elements on two or more core segments. Subsequently, the core segments are bound tightly together to complete the stator.

10 Claims, 15 Drawing Figures

ASSEMBLY METHOD FOR STATOR OR DYNAMO-ELECTRIC MACHINE

BACKGROUND OF THE INVENTION

Many conventional sub-fractional horsepower electric motors and small electric generators utilize a stator that employs a core built up from a plurality of laminations. The core has a continuous rim, affording a magnetic path completely encompassing the stator, with an even number of legs or teeth projecting inwardly of the rim and terminating in pole pieces distributed symmetrically around a rotor-receiving opening. The inner ends of the radial legs, within the stator core, are flared, so that the access to the slots between adjacent legs is quite limited. By reducing the gaps between the inner ends of the adjacent legs to a minimum in order, and thus affording maximum area for the leg tips, which constitute the pole pieces of the stator, flux transfer between the stator and the rotor of the machine is optimized. A plurality of electrical windings are mounted on the legs of the stator core and project through the slots or windows formed between adjacent legs. In single-phase motors and in two-phase generators, there are usually two sets of electrical windings; for three-phase alternators and three-phase motors, three sets of windings are employed.

In manufacturing small stators of this kind, substantial difficulties are encountered in applying the electrical windings. In one conventional technique, the coils are wound individually in place on the stator. For this construction, it is necessary to insert each turn of each winding through the narrow gap between the free inner ends of two of the stator legs, a long and tedious process. The operator must be able to manipulate the wire for the electrical winding in a quite confined space, since the rotor bore of the stator core is often quite small. At the same time, the operator must be careful to prevent separate strands of the electrical wire from entering other slots in the stator core. Small motors and small generators of this general kind are usually wound with wire in a size range of No. 37 to No. 39; No. 39 wire is 0.0035 inch diameter, about the size of a human hair, and is easily broken. Moreover, in winding each coil the worker must carefully adhere to a predetermined winding direction, connecting the coils in alternately opposite directions, since a single coil wound in the wrong direction results in a serious malfunction of the machine.

In some instances, motors and alternators of this general type are assembled from pre-formed coils, separately wound on an external jig or mandrel and subsequently inserted in the stator core through the small gaps between the legs of the core. Again, this is a relatively long and tedious process, since the complete coil is usually too thick to fit through the very limited spaced between adjacent core leg tips. If the assembler works too rapidly, the fragile wire of the coil may easily be broken. Furthermore, it is readily possible to mount a coil in the wrong direction or to connect it in the wrong direction, resulting in a reject motor or alternator. In motors formed with individual coils wound on the stator, or with preformed coils subsequently assembled with the stator core, it is usually necessary to make a compromise in the spacing between the free ends of the stator core legs, leaving gaps that are larger than would be desirable from the standpoint of motor performance in order to make assembly more practical and economical.

One technique that alleviates some of the problems noted above entails the fabrication of the stator core in a plurality of individual segments, each segment including one of the radial core legs. Typically, and as shown in Sheldon U.S. Pat. No. 2,688,103, the stator core segments are of T-shaped configuration. The electrical windings are formed on the individual core segments and the core segments are then assembled to afford a complete cylindrical stator core with the requisite electrical windings already mounted in place. This technique eliminates the necessity for insertion of individual wires or groups of wires through the gaps between the inner ends of the stator core legs and allows widening of the pole pieces at the ends of the stator core legs to achieve improved magnetic coupling to the rotor of the machine. However, in the construction of motors of this kind, it has usually been found necessary to adopt rather elaborate and expensive techniques for surface treatment of the stator core to avoid electrical short circuits. Moreover, each electrical winding is formed individually and must be separately connected to the remaining coils in the stator assembly, affording multiple opportunities for breaking the tiny and delicate wire ordinarily employed. The extent of this possibility is emphasized by the fact that for a simple four pole motor, a total of at least sixteen intercoil connections are required. Furthermore, the winding of the electrical coils on separate individual stator segments precludes their subsequent connection in a manner such that two of the stator core legs can form a single pole. Thus, in a two-winding motor, or similar alternator, only half of the stator core legs are available for use with each of the two windings, resulting in a substantial loss of magnetic efficiency. Moreover, the possibility of incorrect connections remains the same as for other more conventional manufacturing techniques.

SUMMARY OF THE INVENTION

It is a principal object of the present invention, therefore, to provide a new and improved method of manufacturing a stator for a dynamo-electric machine, of the kind generally described above, that effectively and inherently minimizes or eliminates the problems and difficulties encountered in connection with previously known manufacturing techniques.

An additional principal object of the invention is to provide a new and improved stator construction for a dynamo-electric machine that allows for insertion of the electrical windings into the stator core from the outside, that materially reduces the labor involved in manufacture of the stator, and that enhances performance in comparison with some previously known machines.

A particular object of the invention is to provide a new and improved method of manufacturing a stator for a dynamo-electric machine that minimizes the possibility of error in the directions of the individual stator windings.

A further object of the invention is to provide a new and improved method of manufacturing a stator for a dynamo-electric machine that allows the use of pole tips of maximum extend without interferring with the mounting of electrical windings on the stator core.

A further object of the invention is to provide a new and improved stator for a dynamo-electric machine, and an improved method of manufacturing that stator, that reduces the number of winding connections to a minimum and that further reduces the possibility of wire breakage in comparison with conventional constructions.

In one aspect, the present invention relates to a method of manufacturing a stator for a dynamo-electric machine of the kind comprising a magnetic core that includes a cylindrical rim and a plurality of radially inwardly directed legs terminating at closely spaced intervals around the periphery of an axial rotor opening, with electrical windings mounted on the core and extending through the windows formed between the core legs. The method comprises the following steps:

A. loosely assembling a plurality of core segments, each comprising a tangent rim element and a radial leg element;
B. spreading a first pair of adjacent core segments to afford a substantial gap between their rim elements;
C. inserting an electrical winding element through the gap between the rim elements of the first pair of core segments and into the window between their respective leg elements;
D. closing the gap between the first pair of core segments;
E. repeating steps B through D until at least one electrical winding, including elements encompassing all of the radial core legs, is mounted on the core segments;
F. and thereafter binding the core segments together, with the rim element of each core segment in abutting contact with the rim elements of the two adjacent core segments to afford a continuous magnetic path around the periphery of the stator core.

In another aspect, the present invention relates to a stator for a dynamo-electric machine. The stator comprises a plurality of magnetic core segments, each formed of a stack of magnetic laminations and each comprising a tangent rim element and a radial leg element. The core segments are assembled together to afford a cylindrical magnetic core having a continuous magnetic path around its periphery and having a plurality of coil-receiving windows, one window between the leg elements of each adjacent pair of core segments. The stator further comprises a plurality of electrical insulators, one mounted in each core window and lining the inner surfaces of the core window; each insulator has a discontinuity aligned with the juncture of the rim elements of the two core segments that form the window in which the insulator is mounted. A plurality of electrical windings, pre-formed externally of the core, are mounted on the core, from the outside, by insertion into the aforementioned coil windows through temporary gaps between the rim elements of the adjacent core segments. Means are provided to bind the core segments together to maintain a continuous magnetic path around the periphery of the stator core.

DESCRIPTION OF THE PREFERRED EMBODIMENTS

Figures 1, 2, 4:
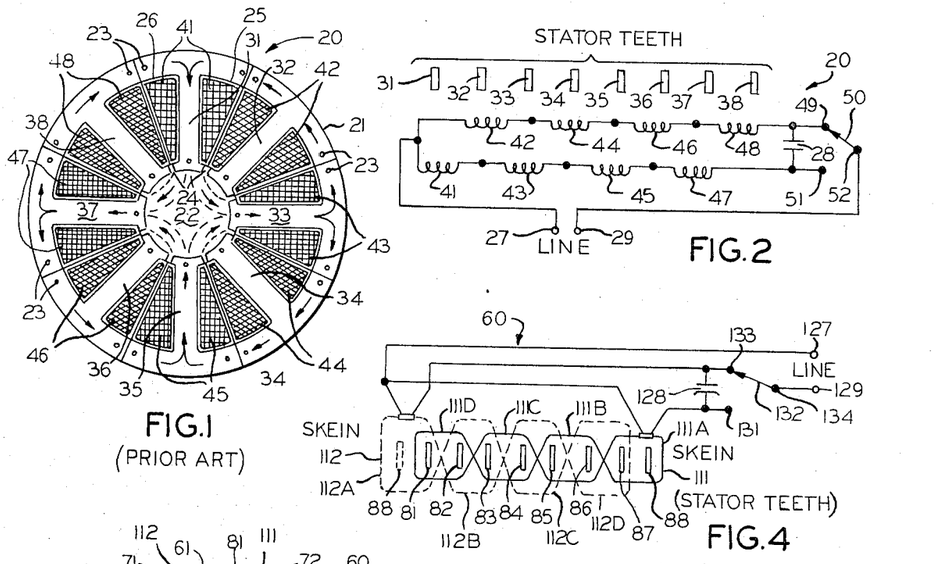
FIG. 1 is an elevation view, partly in cross section, of a stator for a dynamo-electric machine fabricated in accordance with known techniques.
FIG. 2 is a schematic diagram of the electrical circuit for the stator illustrated in FIG. 1.
FIG. 4 is a schematic electrical diagram for the stator illustrated in FIG. 3.

FIGS. 1 and 2 illustrate the stator of a conventional sub-fractional electric motor, or generator, of the kind employing two distinct electrical windings. The stator 20 illustrated in FIGS. 1 and 2 comprise an annular magnetic rim 21 having eight legs or teeth 31 through 38 projecting radially inwardly from the rim at equal angular intervals of 45°. Legs 31–38 terminate, at their inner ends, in a series of eight individual pole pieces that are distributed symmetrically around the periphery of a central rotor-receiving opening 22. Stator 20 is intended for use in a low-inertia motor of the kind frequently employed in instrumentation and related applications, and utilizes a central rotor opening 22 that is quite small in diameter as compared with the outside diameter of the stator rim 21.

The magnetic structure of stator 20, comprising rim 21 and legs 31–38, is built up from a multiplicity of laminations of thin magnetic steel, bound together by suitable means such as the individual rivets 23. In some conventional motors, the magnetic structure of the stator core is fabricated from complete annular stampings. In the construction shown in FIG. 1, the stator core is assembled from a plurality of T-shaped core segments, each including one of the legs 31–38.

The inner ends of the radial legs 31–38 are each flared to afford a pole piece having an area facing the central opening 22 that is somewhat wider than the core leg itself. Each pole piece is separated from the adjacent pole pieces by a small gap 24, as generally indicated by the gaps 24 on the opposite sides of the pole piece afforded by the inner end of leg 31. For a core built up from individual segments, as shown in FIG. 1, the gaps 24 may be quite small. If the mangetic core were assembled from complete annular stampings, the gaps 24 would probably be made somewhat larger to facilitate insertion of electrical windings in the stator core.

Stator 20, as illustrated in FIGS. 1 and 2, further comprises a plurality of electrical windings constituting eight distinct coils 41 through 48. Coil 41 is wound upon stator leg 31, as shown in FIGS. 1 and 2, coil 42 is disposed in encompassing relation to core leg 32, etc. One side of coil 41 is insulated from core leg 31 and from the adjacent coil 42 by an insulating wrapper 25. The other side of coil 41 is insulated from core leg 31 and from the adjacent coil 48 by a similar insulator wrapper 26. A corresponding construction is used for each of the coils throughout stator 20. It will be seen that one half of coil 41 and one half of coil 42 are disposed within the window formed in the magnetic core between core legs 31 and 32. Similarly, the window between legs 32 and 33 accommodates one half of coil 42 as well as one side of coil 43. This arrangement applies throughout the stator 20.

The relative alignment of the coils 41–48 and the stator teeth 31–38 is shown schematically in FIG. 2. The odd-numbered coils 41, 43, 45 and 47 are connected in series with each other, coil 41 being connected to a first line terminal 27. Coils 42, 44, 46 and 48 are connected in series with each other, coil 42 also being connected to line terminal 27. Coils 47 and 48 are connected to the opposite sides of a capacitor 28. In addition, coil 48 is connected to one terminal 49 of a reversing switch 50, and coil 47 is connected to a second terminal 51 of the switch; the common terminal 52 of switch 50 is connected to a second line terminal 29.

It will be recognized that stator 20, as shown in FIG. 2, corresponds to a conventional stator construction for a four-pole two-phase motor. With switch 50 in the position shown in FIG. 2, coils 42, 44, 46 and 48 function as the main winding of the motor and coils 41, 43, 45 and 47 constitute a split-phase winding for the motor. The current to the odd-numbered coils is displaced in phase from the current in the even-numbered coils, due to the presence of capacitor 28 in the operating circuit for the winding comrpising the odd-numbered coils. To reverse the direction of rotation of the motor, switch 50 is actuated to engage terminal 51 instead of terminal 49. When this is done, the odd-numbered coils 41, 43, 45 and 47 constitute the main winding of the motor and the even-numbered coils serve as the phase-displaced winding.

In stator 20, in the construction shown in FIG. 1, each motor winding utilizes only four of the radial stator core legs 31–38 and hence provides only four pole pieces facing the central aperture 22 in which the rotor of the machine is mounted. At any given instant, with an alternating current applied to the line terminals 27 and 29, the legs or pole pieces 31 and 35 may constitute north poles, in which case the legs 33 and 37 comprise south poles. Under these circumstances, the distribution of flux in the magnetic core, induced by the odd-numbered windings 41, 43, 45 and 47, is as indicated by the arrows in FIG. 1. It is seen that the flux paths produced under these circumstances link leg 31 t0 legs 33 and 37 and also link leg 35 to legs 33 and 37. However, the remaining core legs 32, 34, 36 and 38 do not participate effectively in the coupling of magnetic flux from the stator to a rotor disposed in space 22. On the other hand, the even-numbered coils 42, 44, 46 and 48 embrace flux paths confined to legs 32, 34, 36 and 38. Thus, the odd-numbered legs 31, 33, 35 and 37 do not constitute an effective part of the flux path for the magnetic flux developed by energization of the even-numbered coils 42, 44, 46 and 48.

Using the segmented construction illustrated in FIG. 1, it is extremely difficult and may be virtually impossible to mount the electrical windings 41–48 on the stator core 21 in a manner such that the coils of both the main and the phase-displaced windings incorporate all of the individual legs of the stator core in their magnetic flux paths. The coils can be wound on the stator segments before the segments are assembled limiting possible wire breakage as compared with windings formed on a complete annular core. Even with a segmented core, however, considerable difficulty may be encountered in maintaining correct connections when the stator is assembled and the coils are interconnected as shown in FIG. 2. Of course, if one of the odd-numbered coils is connected in series with the even-numbered coils, or if the direction of any of the coils is reversed in the connection process, the motor (or generator) in which stator 20 is incorporated will not function properly.

Figures 9, 10:
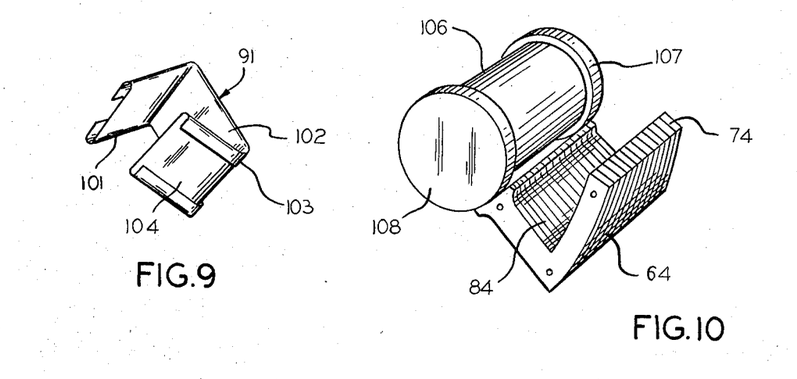
FIG. 9 is a detail perspective view of a window insulator employed in the assembly of a stator constructed in accordance with the present invention.
FIG. 10 is a perspective view of a preliminary stage in the assembly method illustrated in FIG. 5.

FIGS. 3 through 10 illustrate the manufacture and assembly of a low inertia motor, dimensionally comparable to the motor of FIG. 1, utilizing the method of the present invention. A stator 60, constructed in accordance with the invention, is shown assembled in FIG. 3; the electrical circuit for stator 60 is illustrated schematically in FIG. 4. Stator 60 comprises a plurality of magnetic core segments 61, 62, 63, 64, 65, 66, 67 and 68, each formed from a stack of generally L-shaped magnetic laminations, as best illustrated by the individual segment 64 (FIG. 10). Segment 61 (FIGS. 3,5) includes a tangent rim element 71 and a radial leg element 81. Each of the remaining segments 62–68 is of similar construction. Thus, the core segments 62 through 68 include the individual tangent rim elements 72 through 78 and the individual teeth or leg elements 82 through 88. When stator core 60 is assembled, segments 62–68 afford a complete cylindrical magnetic core having a continuous magnetic path, formed by the tangent rim elements 62–68, around the periphery of the core and having a plurality of coil-receiving windows, one window between each adjacent pair of the leg elements 81– 88.

Figure 5:
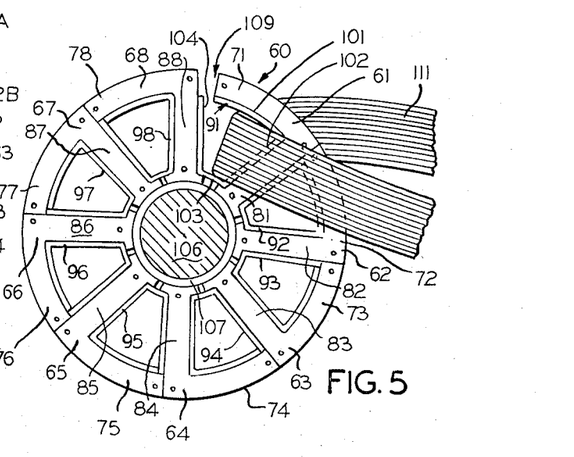
FIG. 5 is an elevation view illustrating a preliminary step in the assembly of a stator in accordance with the present invention.

In assembling stator 60, a plurality of individual electrical insulators are mounted in the core segments 61–68. This aspect of the construction is illustrated in FIG. 5. As shown therein, an electrical insulator lining 91 is positioned in the window between core legs 81 and 88. A similar insulator 92 is positioned in the window intermediate legs 82 and 83. Additional similar insulators are identified by reference numerals 94, 95, 96, 97 and 98.

The construction of one of the insulators 91–98 is illustrated in FIG. 9. As shown therein, insulator 91 is formed from a thin sheet of fibre or other insulator material, with the edges of the strip preferably bent double to provide some stiffening and to help retain the insulator in place in the stator core. Insulator 91 includes a first section 101; section 101 is preferably bonded to the tangent rim element 71 of core segment 61, as shown in FIG. 5. Insulator 91 (FIG. 9) further includes additional sections 102, 103 and 104 (FIG. 9). When mounted in the stator core as shown in FIG. 5, it is seen that insulator section 102 extends along core leg 81, whereas section 103 spans the narrow gap between the core legs 81 and 88 and prevents any part of the stator winding from entering that gap. Section 104 extends along core leg 88. The discontinuity between the extreme ends 101 and 104 of insulator 91, in the assembled core 60, is aligned with the edge of the rim element 71 of core segment 61 that abuts the rim element 78 of the adjacent core segment 68. The same alignment for the insulators is used throughout the stator core 60.

Figure 3:
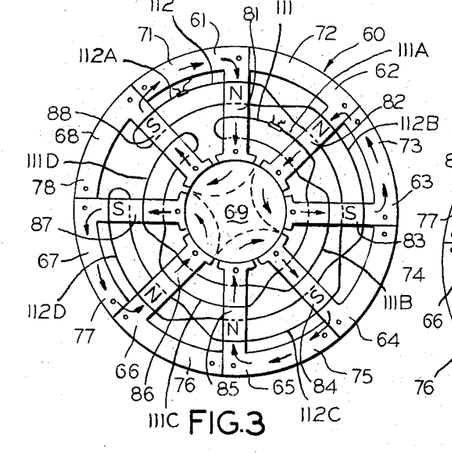
FIG. 3 is an elevation view, partly schematic, of a stator for a dynamo-electric machine constructed in accordance with the present invention.
Figures 6, 6A, 7:
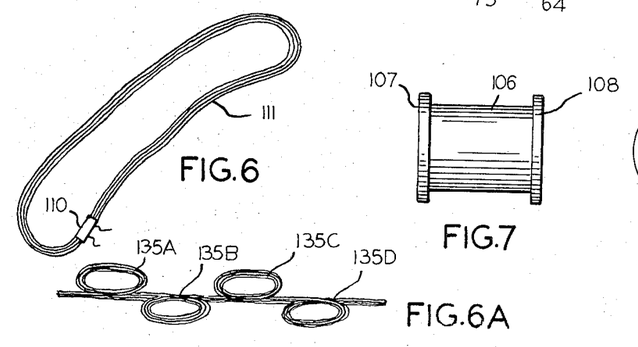
FIG. 6 is a detail illustration of an electrical winding sub-assembly employed in the manufacture of the stator of FIG. 5.
FIG. 7 is a side elevation view of a fixture used in the manufacturing step illustrated in FIG. 5.
Figure 8:
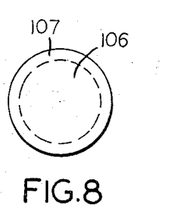
FIG. 8 is an end elevation view of the device of FIG. 7.

In assembling stator 60, the individual core segments 61–68 are mounted upon a spool or bobbin 106 as shown in FIG. 5; bobbin 106 is shown in greater detail in FIGS. 7 and 8. The bobbin 106 comprises a permanent magnet of cylindrical configuration having two disc-shaped pole pieces 107 and 108 that are slightly larger in diameter than the desired diameter for the central rotor-receiving opening 69 of the completed stator 60 (FIG. 3). Since the core segments 61–68 are formed of laminated magnetic sheet steel, they can be mounted upon bobbin 60, and specifically on the discs 107 and 108 of the bobbin, in the manner shown in FIG. 5. The core segments, when mounted on bobbin 106, afford a relatively open or loose assembly, due to the oversize configuration of discs 107 and 108. This makes it possible to spread any pair of core segments from each other, on an angular basis, to afford a temporary gap of substantial size between the rim elements of the core segments, as illustrated by the gap 109 between core segments 61 and 68 in FIG. 5.

The electrical windings for stator 60 are preferably formed by two relatively large winding skeins, exemplified by the skein 111 illustrated in FIG. 6. Skein 111 is a single large physical coil, comprised of a multiplicity of turns of fine electrical wire, formed to a predetermined size by winding upon a suitable mandrel or jig with the two ends of the skein clamped together as indicated at reference numeral 110. To mount the electrical windings on stator 60, the stator core segments 61–68 are loosely assembled on bobbin 106 as shown in FIG. 4. A first pair of adjacent core segments 61 and 68 are then spread apart to afford a substantial temporary gap 109 between their aligned rim elements 71 and 78. The electrical winding element, skein 111, is then inserted through the gap 109 and into the window between core legs 88 and 81.

When the core segments 68 and 61 are spread apart, producing gap 109, insulator 91 is also spread so that the electrical winding skein 111 can be inserted into the interior of the insulator 91. The insulator tends to spring open; it may be spread manually or mechanically if necessary. Subsequently, with skein 111 inserted into the window between legs 81 and 88, segments 61 and 62 are shifted a short distance in a counterclockwise direction, closing gap 109 and opening a new gap between the adjacent rim elements 72 and 73 of core segments 62 and 63; insulator 93 is also opened up. The two sides of skein 111 are then inserted through the gap between rim elements 72 and 73 into the window intermediate core legs 82 and 83.

When this has been done, core segments 63 and 64 are rotated around bobbin 106 through a short distance, in a counterclockwise direction, closing the gap between core segments 62 and 63 and opening a new gap between the tangent rim elements 74 and 75 of core segments 64 and 65. The two sides of skein 111 are then inserted through the new gap and into the interior of the insulator 95. Core segments 65 and 66 are then rotated a short distance in a counterclockwise direction to close the gap between segments 64 and 65 and open yet another gap between the tangent rim elements 76 and 77 of core segments 66 and 67. The two sides of skein 111 are then inserted through the newest gap between the rim element 76 and 77, into the interior of the insulator 97 in the window between legs 86 and 87.

Thereafter, the core segments 67 and 68 are rotated a short distance counterclockwise around bobbin 106 to close the gap between segments 66 and 67 and to open gap 109 again between the tangent rim elements 78 and 71 of core segment 68 and 61. The end of the skein 111 is then inserted through gap 109, into the core window encompassed by insulator 91, to complete the mounting of the first winding on stator 60. Skein 111 fits readily into gap 109, since the end of tangent rim element 78 of core segment 68 is flush with leg 88, minimizing any requirement for stretching the skein. The overall configuration for this first winding skein 111, which constitutes a complete winding of four coil portions 111A–111D, is shown in FIG. 3 and is also illustrated in schematic form in FIG. 4.

The same process is repeated, using a second winding skein 112 similar to skein 111, in order to provide a second winding on stator 60, comprising four coil portions 112A–112D, and thus afford a complete two-phase stator. As illustrated in FIG. 3, one end of the second electrical winding skein 112 is first inserted into the window between core legs 87 and 88, through an external gap in the rim of the core formed by spreading core segments 67 and 68 with respect to each other and thus affording a gap between their tangent rim elements 77 and 78. The skein is then inserted into and crossed over in the window between core legs 81 and 82, then between legs 83 and 84, and then between legs 85 and 86, and is finally looped around leg 87 to complete the second winding. This completes the windings for stator 60, providing the stator with two complete electrical windings each including four effective coils; each coil portion embraces two of the core legs or teeth 81–88, as illustrated in both FIGS. 3 and 4.

As shown in FIGS. 3 and 4, there are only four electrical connections to be made to the two winding skeins 111 and 112 that constitute the complete electrical windings for stator 60. One of the two electrical leads from skein 111 is connected to a first line terminal 127 (FIG. 4). One of the two electrical leads from skein 112 is also connected to line terminal 127. The other electrical lead from skein 111 is connected to one side of a capacitor 128 and to one terminal 131 of a reversing switch 132. The second electrical lead from skein 112 is connected to the other side of the capacitor 128 and to a second terminal 133 of switch 132. The common terminal 134 of reversing switch 132 is connected to a second line terminal 129.

With switch 132 in the position shown in FIG. 2, skein 112 is connected directly across line terminals 127 and 129; accordingly, the four loops or coils formed by skein 112 function as the main, in-phase winding for stator 60, assuming that the stator is a part of a conventional split-phase motor. The other skein 111 is also connected to line terminals 127 and 129, but the capacitor 128 is in series with the four coils formed by this skein so that there is a substantial phase displacement, affording the requisite rotating magnetic field for effective motor operation. By actuating the reversing switch 132 to its alternate position, the relationship of the two winding skeins 111 and 112 is reversed, skein 111 becoming the in-phase winding and skein 112 becoming the displaced-phase winding with capacitor 128 connected in series therewith.

The magnetic field coupling to a rotor disposed in the central aperture 69 of stator 60 (FIG. 3) is substantially different from that afforded a rotor in the central aperture 22 of stator 20 (FIG. 1). At any given instant, the electrical signal in the loop or coil of skein 111 that encompasses legs 81 and 82 produces corresponding magnetic effects in both legs. Thus, at any given moment when the electrical current in skein 111 induces magnetic flux in leg 81 in a direction that produces a north pole at the pole piece facing aperture 69, the pole piece at the inner end of leg 82 also constitutes a north pole. For this instantaneous operating condition, the pole pieces at the inner ends of legs 85 and 86 are also north poles and the pole pieces at the inner ends of legs 83, 84, 87 and 88 are all south poles. This produces a flux distribution along paths as indicated by the arrows in FIG. 3, with the flux from leg 81 coupling to the immediately adjacent leg 88, the flux from leg 82 coupling predominately to leg 83, the magnetic flux from leg 84 going to leg 85, and the magnetic flux from leg 86 coupling predominately to leg 87. All eight of the legs 81–88 are directly and effectively involved, in this manner, in the magnetic circuit for the four-coil winding afforded by skein 111. It will be seen from FIG. 3 that the same situation applies to the four coils defined by skein 112. Accordingly, the magnetic efficiency of the motor constructed in accordance with the present invention, utilizing all of the stator core legs for both of the electrical windings, is materially enhanced as compared with the 50 percent usage afforded by the prior art arrangement shown in FIG. 1.

Another substantial advantage of the construction illustrated in FIG. 3 pertains to the dimensions of the pole-pieces formed on the inner ends of core legs 81–88. Using the construction technique described above, all of the electrical windings are inserted through relatively large gaps temporarily formed around the outer periphery of the stator core. Consequently, the polepiece gaps at the inner ends of the core legs are not affected by the mechanical requirements for motor construction and can be made as narrow as desired to obtain optimum coupling to a rotor disposed within aperture 69. Thus, the compromise between construction requirements and magnetic circuit requirements that must be observed in many conventional motors does not apply to and does not affect the present invention as illustrated in FIGS. 3–5.

Assembly of stator 60, using the techniques and structural features described above and illustrated in conjunction with FIGS. 3–10, materially reduces the labor required for manufacture of the stator, in addition to affording substantial advantages in regard to the operational characteristics of the stator. There are only four electrical connections to be made once the stator is assembled, so that the possibility of making a reversed connection is materially reduced. Simple alternation in the insertion of the skeins 111 and 112 into the stator, which can be accomplished by the operator without the problems inherent in multiple individual coils, assures that each coil formed by the two skeins 111 and 112 is wound in the right direction. If the four skein terminals are improperly connected to line terminal 127 or to switch 132, the worst result is a reversal in the direction of rotation for the completed motor or generator, which can be readily corrected with a minimum number of electrical changes and hence with a minimum labor requirement. The possibility of wire breakage is greatly reduced because the gaps afforded for insertion of the windings are substantially larger than can be afforded with conventional techniques and structures.

It is not essential that L-shaped core segments be employed, as illustrated in FIGS. 3, 5 and 10; the same basic construction method can be applied to T-shaped core segments of the kind illustrated in FIG. 1. However, the L-shaped segments are preferred because they permit insertion of a skein winding without requiring use of a skein of excessive length in order to fit over a projecting leg in the tangential rim portion of the last core segment engaged by the skein. For that matter, individual pre-wound coils can be utilized instead of the skein winding arrangement described in detail above. Thus, a series of four discrete preformed coils 135A through 135D (FIG. 6A) can be utilized instead of skein 111, with coil 135A looped around core legs 81 and 82, coil 135B around legs 83 and 84, coil 135C around legs 85 and 86, and coil 135D looped around legs 87 and 88, using the same outside-in insertion technique described above. Of course, skein 112 could be replaced by a similar group of preformed coils. The skein winding system is usually preferred because it reduces the possibility of insertion of a coil in the wrong direction, which can take place when individual pre-wound electrical coils are utilized.

Figure 11:
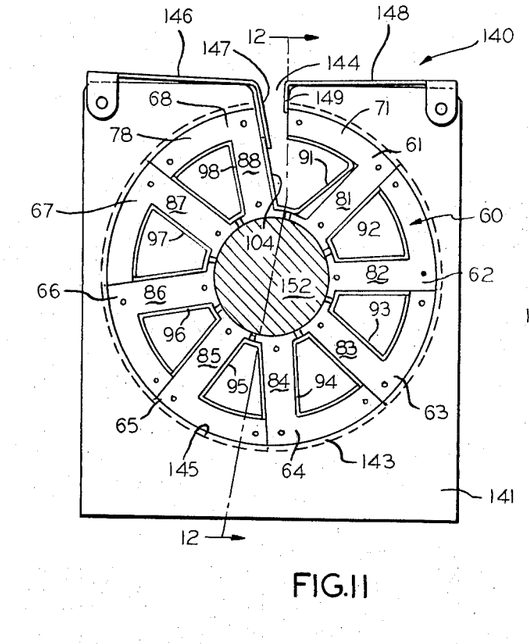
FIG. 11 is an end elevation view of a different form of fixture that may be employed in carrying out the method of the present invention.
Figure 12:
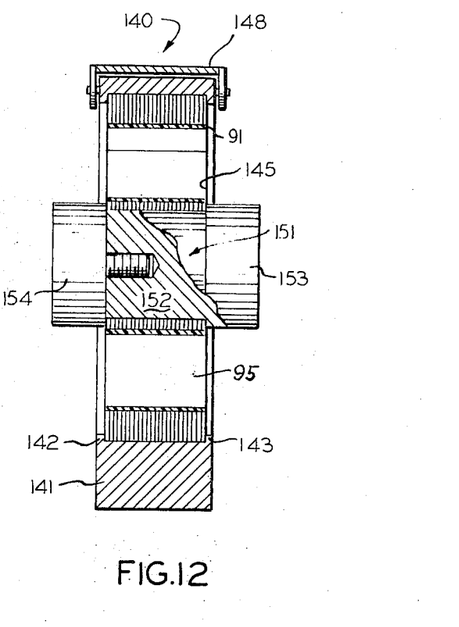
FIG. 12 is a sectional view taken approximately along line 12—12 in FIG. 11.

FIGS. 11 and 12 illustrate a mounting fixture 140 that can be employed with the same stator core as illustrated in FIGS. 3 and 5 and that affords some additional advantages with respect to fabrication of the complete stator 60. The mounting fixture 140 comprises a base 141 having a central aperture 145 of circular configuration with an axial length equal to the axial length of core 61 and having two side flanges 142 and 143 of smaller internal diameter than the core of stator 60. Base 141 is provided with a slot 144 located at the top of the fixture base and extending into the central aperture 145.

A first spring retainer 146 is pivotally mounted upon the upper left-hand corner of base 141, as viewed in FIG. 11; retainer 146 includes an elongated retaining finger 147 that projects downwardly into slot 144. A second spring retainer 148 is pivotally mounted on the opposite upper corner of base 141 and includes a shorter retaining finger 149 that extends into the opposite sides of slot 144.

Fixture 140 further comprises a bobbin 151 that is best illustrated in FIG. 12. Bobbin 151 includes a central portion 152 that is slightly larger in diameter than the central rotor-receiving aperature 69 of the completed stator core 60 (see FIG. 3). There is an integral flange 153 on one end of the bobbin. Bobbin 151 further comprises a removable flange member 154 mounted on the opposite end of element 152.

In utilizing mounting fixture 140, the two spring retainers 146 and 148 are pivoted outwardly of base 141 to a position clear of slot 144. The individual core segments 61–68 for core 60 are then positioned in the central aperture 145 of base 141. This is easily accomplished by placing base 141 on its side, then placing the individual stator core segments 61–68 in the central aperture 145 of the base, between flanges 142 and 143. The central portion 152 of bobbin 151 can then be inserted into the center of the array of stator core segments, after which the removable flange 154 is mounted on the bobbin. When this is accomplished, all of the stator core segments are loosely assembled in the fixture, and can be rotated to bring the rim juncture of any pair of core segments into alignment with the slot 144 in base 141.

To start the procedure of mounting electrical windings in stator core 60, using fixture 140 (FIGS. 11 and 12), the juncture of segments 61 and 68 is brought into alignment with slot 144. Spring retainer 148 is then pivoted counterclockwise to bring its retaining finger 149 into engagement with the free end of the tangent rim element 71 of core segment 61, holding core segment 61 in the position illustrated in FIG. 11. Similarly, spring retainer 146 is pivoted in a clockwise direction to insert the retaining finger 147 into slot 144. Finger 147 extends far enough into the slot to hold the leg 104 of insulator 91 against front leg 88, affording the desired substantial gap between core segments 68 and 71 to permit ready insertion of an electrical winding into the window in core 60 between legs 81 and 88.

The basic winding procedure may be carried out as described above in conjunction with FIG. 4, and hence need not be described in detail. Each time a new element of the electrical winding is inserted into one of the windows, the retainers 146 and 148 are pivoted out of slot 144 and the core segments are rotated in jig 140 to bring the next pair of core segments into alignment with the slot. The spring retainers are then re-inserted to form and maintain the desired gap in the rim of the stator core that allows insertion of the winding element into the new window. This sequence of operations is carried out, as described above, until all of the windings are mounted upon the stator core, after which the core and windings are removed from fixture 140 and the core segments are bound together with their rim elements engaged in abutting contact (see FIG. 3) to afford the requisite continuous magnetic path around the periphery of the stator core.

Figure 13:
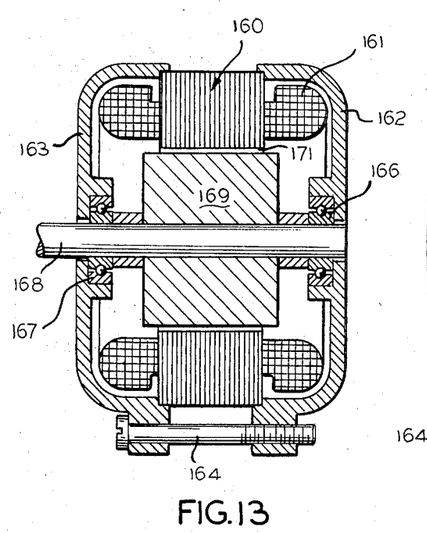
FIG. 13 is a longitudinal sectional view of a small dynamo-electric machine.
Figure 14:
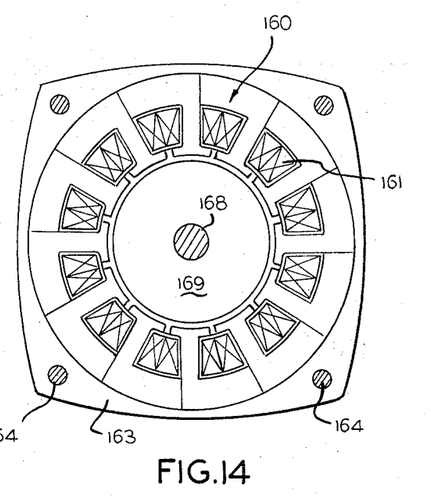
FIG. 14 is a transverse sectional view of a preferred stator core construction for the motor of FIG. 13.

FIGS. 13 and 14 illustrate a complete machine, utilizing a stator 160 constructed in accordance with the present invention. Stator 160 may correspond in construction to the previously described stator 60 but may incorporate a different number of internal legs or teeth, and hence a different number of magnetic core segments. Thus, stator 160 may comprise a 12-pole construction as shown in FIG. 14. In FIG. 13, the stator windings are generally indicated by reference numeral 161. The individual segments of core 160 are clamped together between two end bells 162 and 163 that are connected by a plurality of mounting bolts 164. The end bells 162 and 163 support two bearings 166 and 167, respectively, a shaft 168 being journalled in the two bearings. A suitable rotor 169 is mounted on shaft 168 and is positioned within the central aperture 171 of stator 160. In this simple construction, the end bells 162 and 163 serve as the requisite means for binding or clamping the individual core segments of stator 160 together and also afford a support for the motor shaft 168 and rotor 169.

Figure 15:
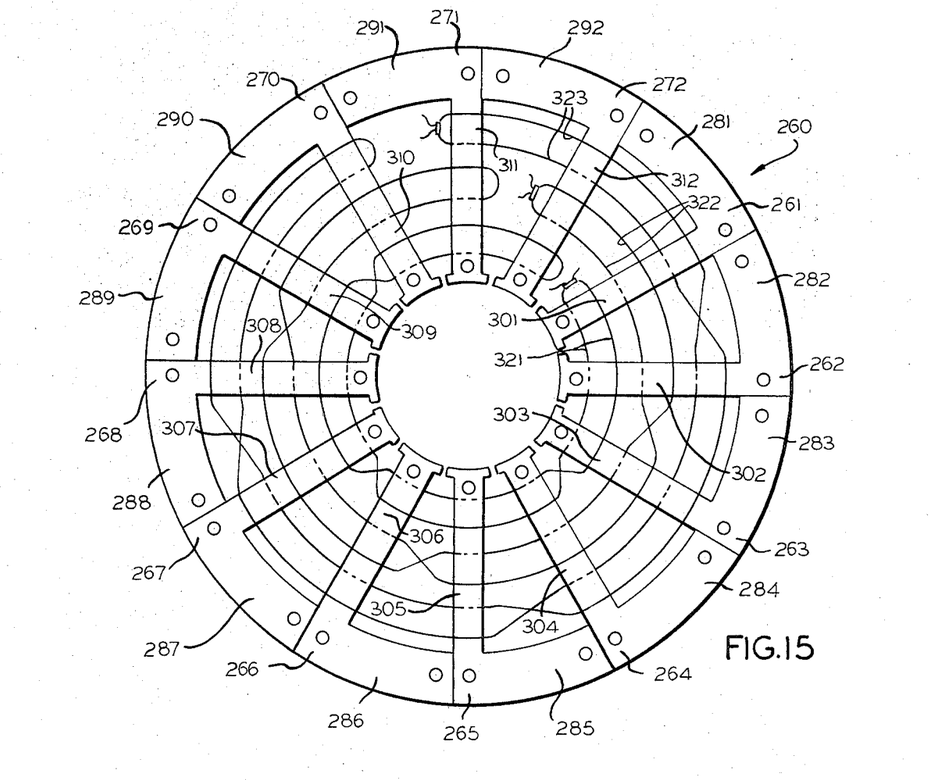
FIG. 15 is a partly schematic illustration of the stator for a three-phase dynamo-electric machine constructed in accordance with the present invention.

FIG. 15 is a partially schematic view, similar to FIG. 3, that illustrates a stator 260, constructed in accordance with the present invention and provided with three separate windings to afford a three-phase dynamo-electric machine, either a motor or a generator. The core of stator 260 comprises 12 individual core segments 261 through 272, each fabricated as a stack of thin laminations of electrical steel. Each of the core segments includes a tangent rim section, the rim sections being identified by reference numerals 281 through 292. The core segments 261 through 272 also afford twelve inwardly projecting legs 301 through 312.

Like stator 60, (FIG. 3), stator 260 is skein wound. The first winding comprises a wire skein 321. In placing the skein winding 321 on the core of stator 260, the core segments 261–272 are first loosely assembled in a circular array. Segments 261 and 272 are then spread apart somewhat to afford a substantial temporary gap between their rim elements 281 and 292. Skein 321 is inserted through this gap in the rim of the stator core and into the core window between legs 301 and 312. The gap between core elements 261 and 272 is then closed, and core segments 263 and 264 are spread apart to produce a new gap between their tangent rim elements 283 and 284. The two sides of skein 321 are inserted through this new gap into the window between the legs 303 and 304.

The next step in the mounting of skein winding 321 in stator 260 is to close the gap between segments 263 and 264 and to spread segments 266 and 267 to produce a temporary gap between their rim elements 286 and 287. The two sides of skein 321 are inserted through this gap, the gap is closed, and a new gap is then opened between rim elements 289 and 290 of core segments 269 and 270. Skein 321 is crossed over and inserted through this gap into the window between core legs 309 and 310, the gap is closed, and core segments 261 and 272 are again spread to produce a gap between their tangent rim elements 281 and 292. The end of skein 321 is inserted through this gap, into the core window between legs 301 and 312, and the mounting of skein 321 on the core of stator 260 is complete.

The same technique is used in mounting two additional skein windings 322 and 323 in the core of stator 260. This completes the winding of a three-phase stator. Thereafter, the core segments 261–272 are bound together, which may be accomplished by a single band around the outer periphery of the core of stator 260, by a simple end bell arrangement as shown in FIG. 13, or by other appropriate means. With the stator core segments all mounted together, their tangent rim elements engage each other in abutting contact and afford the required continuous magnetic path around the periphery of the stator core.

As in stator 60, each of the electrical windings of stator 260 utilizes all of the legs of the magnetic core. Thus, when the current through winding 321 is in a direction to produce a north pole at the free inner end of core leg 301, the inner ends of legs 302 and 303 also constitute north poles. For this instantaneous electrical condition, the inner ends of legs 307, 308 and 309 are also north poles, whereas south poles are provided at the inner ends of core legs 304–306 and 310–312. The same relationship obtains with respect to each of the additional windings comprising the skeins 322 and 323.

The illustrated winding arrangement can be employed for a three-phase generator or for a three-phase motor. Only six electrical connections are required and it is a relatively simple matter to make the connections properly to obtain effective motor or generator operation. As before, the relatively wide gaps produced in the periphery of the core structure, when the electrical windings are being mounted on the core, minimize the possibility of breaking the delicate wire of the electrical windings. The L-shaped core segments illustrated in FIG. 15 are quite advantageous in using a skein winding, since the end loop of each skein slides over the outer end of the leg that is in alignment with the remainder of the core leg and there is no necessity to loop the skein over a projecting part of the rim. The L-shaped segments are similarly advantageous when used in conjunction with a series of pre-formed coils, such as shown in FIG. 6A. However, the same basic winding techniques can be applied with T-shaped segments of the type illustrated in FIG. 1, although a somewhat looser winding is produced.

In each of the illustrated embodiments of the invention, the tangent rim elements of the core segments (e.g., elements 71–78 in FIGS. 3, 5) are shown as being of arcuate configuration, so that the completed stator is circular in cross-section. This geometry is convenient in manipulating the core segments during insertion of the windings, particularly when using the jig 140. However, there is no necessity for arcuate rim elements; linear rim elements or even other configurations can be employed if desired. The invention has been described as applied to sub-fractional motors and generators, and is principally intended for use in such machines, but could also be applied to larger dynamo-electric machines.

I claim:

1. The method of manufacturing a stator for a dynamo-electric machine, of the kind comprising a magnetic core including a cylindrical rim and a plurality of radially inwardly directed legs terminating at closely spaced intervals around the periphery of a rotor-receiving axial opening, with electrical windings mounted on the core and extending through windows between the core legs, said method comprising the following steps:
   A. loosely assembling a plurality of magnetic stator core segments, each comprising a tangent rim element and a radial leg element, into a cylindrical preliminary stator core assembly corresponding approximately to the required stator configuration
   B. spreading a first pair of adjacent core segments in the stator core assembly to afford a substantial temporary gap between their rim elements;
   C. inserting an electrical winding element through the gap between the rim elements of the first pair of core segments and into the window between their respective leg elements;
   D. closing the gap between the first pair of core segments;
   E. repeating steps B through D for additional pairs of adjacent core segments around the periphery of the preliminary stator core assembly until at least one complete electrical winding, with winding elements encompassing all of the radial core legs, is mounted on the core segments of the assembly;
   F. and thereafter binding the core segments together, with the rim element of each core segment in abutting contact with the rim elements of the two adjacent core segments to afford a continuous magnetic path around the periphery of the stator core.

2. The method of manufacturing a stator for a dynamo-electric machine, according to claim 1, in which the temporary gaps formed in carrying out step B, for a given electrical winding, are displaced by at least two core segments, and the completed electrical winding comprises a series of coils encompassing all of the legs of the stator core.

3. The method of manufacturing a stator for a dynamo-electric machine, according to claim 1, utilizing a single large multi-turn skein for each electrical winding, in which one end of the skein is inserted into a first core window in the first step C, the two sides of the skein are inserted into and crossed over within a different core window during each subsequent step C until the last, and the other end of the skein is inserted into the first core window in the last step C.

4. The method of manufacturing a stator for a dynamo-electric machine, according to claim 3, in which the temporary gaps formed in step B, for a given electrical skein winding, are displaced by at least two core segments, and the skein forms a series of coils encompassing all of the stator core legs.

5. The method of manufacturing a stator for a dynamo-electric machine, according to claim 4, utilizing two skeins to provide two electrical windings, the windows into which the first skein is inserted being alternated with windows into which the second skein is inserted, around the periphery of the stator core, and each skein being inserted into every second window around the core.

6. The method of manufacturing a stator for a dynamo-electric machine, according to claim 4, utilizing three skeins to provide three electrical windings, each skein being inserted into every third window around the core, and each window into which the first skein is inserted being interposed between a window into which the second skein is inserted and a window into which the third skein is inserted.

7. The method of manufacturing a stator for a dynamo-electric machine, according to claim 1, including the additional step of mounting individual insulator linings in the core windows before insertion of any electrical winding element into the windows, each insulator having a discontinuity aligned with the juncture of the rim elements of the two adjacent core segments forming the window in which the insulator is mounted to allow insertion of an electrical winding element into the insulator lining.

8. The method of manufacturing a stator for a dynamo-electric machine, according to claim 7, in which each insulator lining is bonded to the tangent rim element of one of the core segments forming the window in which the insulator lining is mounted.

9. The method of manufacturing a stator for a dynamo-electric machine, according to claim 1, in which assembling step A is effected by mounting the core segments on a magnetic bobbin having a diameter slightly larger than the diameter of the completed stator.

10. The method of manufacturing a stator for a dynamo-electric machine, according to claim 1, in which assembling step A is effected by depositing the core segments in a jig having a central aperture with a diameter slightly larger than the finished stator diameter and a gap in the periphery of the jig, and positioning a bobbin in the center of the assembled core segments to prevent inward displacement of the core segments.

* * * * *